United States Patent [19]
Cox et al.

[11] Patent Number: 6,078,688
[45] Date of Patent: *Jun. 20, 2000

[54] METHOD FOR IMAGE SEGMENTATION BY MINIMIZING THE RATIO BETWEEN THE EXTERIOR BOUNDARY COST AND THE COST OF THE ENCLOSED REGION

[75] Inventors: Ingemar J. Cox, Lawrenceville; Satish B. Rao, Princeton, both of N.J.

[73] Assignee: NEC Research Institute, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/702,351

[22] Filed: Aug. 23, 1996

[51] Int. Cl.$^7$ .................................................. G06K 9/34
[52] U.S. Cl. .................................. 382/173; 382/199
[58] Field of Search .................. 382/173, 199, 382/242, 266, 203, 205, 215, 224, 225, 282; 345/432, 440

[56] References Cited

U.S. PATENT DOCUMENTS

| | | | |
|---|---|---|---|
| 4,233,662 | 11/1980 | LeMay | 364/414 |
| 4,843,630 | 6/1989 | Catros et al. | 382/130 |
| 4,910,786 | 3/1990 | Eichel | 382/199 |
| 5,054,100 | 10/1991 | Tai | 382/263 |
| 5,260,871 | 11/1993 | Goldberg | 382/128 |
| 5,274,565 | 12/1993 | Reuben | 364/474.24 |
| 5,341,142 | 8/1994 | Reis et al. | 342/64 |
| 5,532,934 | 7/1996 | Rostoker | 364/488 |
| 5,544,284 | 8/1996 | Allebach et al. | 345/431 |
| 5,634,113 | 5/1997 | Rusterholz | 395/500 |

OTHER PUBLICATIONS

Michael Kass, et al. "Snakes: Active Contour Models", International Journal Computer Vision, 321–331 (1988).

Laurent D. Cohen "Note On Active Contour Models and Balloons", CVGIP: Image Understanding, vol. 53 No. 2, Mar., pp.211–218 (1991).

Amini, et al. "Using Dynamic Programming for Minimizing the Energy of Active Contours in the Presence of Hard Constraints", IEEE (1988).

Ugo Montanari "On the Optimal Detection of Curves in Noisy Pictures", Communications of the ACM, May 1971, vol. 14, No. 5.

Geiger, et al. "Dynamic Programming for Detecting, Tracking, and Matching Deformable Contours", IEEE Transactions on Pattern Analysis and Machine Intelligence, vol. 17, No. 3, Mar. 1995.

Chakraborty, et al. "Deformable Boundary Finding Influenced by Region Homogenity", IEEE (1994).

(List continued on next page.)

*Primary Examiner*—Ameolia Au
*Assistant Examiner*—Timothy M. Johnson
*Attorney, Agent, or Firm*—Philip J. Feig

[57] ABSTRACT

Segmentation of an image into separate regions is useful in many computer vision problems. The separate regions may be represented by their enclosing contours. A planar graph is constructed for each image. The optimal contour is determined by the assignment of edge costs and face weights of the graph. An algorithm is provided such that given a planar graph G = (V,E) where V is a set of nodes, E is a set of edges and each edge e is provided with a non-negative cost c(e) and each face f of the planar graph is provided with a non-negative weight w(f), and given a single node v in G and single face F adjacent to v which is viewed as the exterior face, then find a directed path P in G that starts and finishes at v and minimizes $$\mathcal{L} = \frac{\mathrm{cost}(P)}{\mathrm{weight}(P)}$$

where cost(P) is defined as the length of the path under c, and weight (P) is the weight of the faces that are separated from F by P. The contour that minimizes $\zeta$ is the optimal contour.

19 Claims, 9 Drawing Sheets

OTHER PUBLICATIONS

Remi Ronfard "Region–Based Strategies for Active Contour Models", International Journal of Computer Vision, 13:2, 229–251 (1994).

Yvan G. Leclerc "Constructing Simple Stable Descriptions for Image Partitioning" International Journal of Computer Vision, 3, 73–102 (1989).

Zhu, et al. "Region Competition: Unifying Snakes, Region Growing, Energy/Bayes/MDL for Multi–band Image Segmentation", Fifth Int. Conf. On Comp. Vision, IEEE (1995).

Wu, et al. "An Optimal Graph Theoretic Approach to Data Clustering: Theory and Its Application to Image Segmentation", IEEE Transactions on Pattern Analysis and Machine Intelligence, vol. 15, No.11, Nov. 1993.

Satish B. Rao "Faster Algorithms for Finding Small Edge Cuts in Planar Graphs", Proc. of the 24$^{th}$ Annual ACM Symposium on Theory of Computing, pp 29–240 (May 1992).

Rao, Faster Algorithms for Finding Small Edge Cuts in Planar Graphs, May 1992, pp. 229–240.

Geiger et al., Dymanic Programming for Detecting, Tracking, and Matching Deformable Contours, Mar. 1995, pp. 294–302.

Amini et al., Using Dynamic Programming for Minimizing the Energy of Active Contours in the Presence of Hard Constraints, 1988, pp. 95–199.

Kass et al., Snakes: Active Contour Models, 1988, pp. 321–331.

Wu et al., An Optimal Graph Theoretic Approach to Data Clustering: Theory and Its Application to Image Segmentation, Nov. 1993, pp. 1101–1113.

Montanari, On the Optimal Detection of Curves in Noisy Pictures, May 1971, pp. 335–345.

METHOD FOR IMAGE SEGMENTATION BY MINIMIZING THE RATIO BETWEEN THE EXTERIOR BOUNDARY COST AND THE COST OF THE ENCLOSED REGION

FIELD OF THE INVENTION

The present invention relates to image segmentation and particularly to image segmentation where a segmented region has both an exterior boundary cost and a benefit assigned to the enclosed interior region. Specifically, the ratio between the exterior boundary cost and the enclosed interior benefit is minimized by means of a computationally efficient graph partitioning algorithm.

BACKGROUND OF THE INVENTION

Segmentation is useful in a wide range of computer vision applications, but fully automatic segmentation remains a difficult problem. There has been extensive work on image segmentation as well as the broader problem of data partitioning. See, for examples, Duda and Hart's "Pattern Classification and Scene Analysis," (John Wiley and Sons: 1973), or the Proc. DIMACS Workshop on Partitioning Data Sets: With applications to psychology, vision and target tracking, I. J. Cox et al, eds (American Mathematical Society: 1994), or Jain and Dubes' "Algorithms for Clustering Data" (Prentice Hall: 1988). The goal of segmentation is to find groups of data which are both homogeneous, such that data in the same group are similar, and well separated, such that data in different groups are dissimilar. Many approaches have been proposed, which may be broadly categorized as either contour-based, region-based or a combination of both.

Contour-based methods usually attempt to partition an image based solely on local measures of dissimilarity. Conversely, region-based methods partition an image based on local measures of similarity. There has been significant progress on interactive contour-based segmentation, based upon the work of Kass et al described in an article entitled "Snakes: Active contour models," in Int. J. Computer Vision, pages 321–331 (1988) and of Blake and Zisserman described in the book entitled "Visual Reconstruction," (MIT Press: 1987). The interactive initialization of the active contour or snake near the desired boundary significantly reduces the difficulty of segmentation. However, there are several difficulties with the method, including sensitivity of the final solution to the initialization and computational requirements. Cohen, in an article entitled "Note on active contour models and balloons," in CVGIP: Image Understanding, vol. 53(2), pages 211–218 (March 1991), introduced a "balloon force" which can either inflate or deflate the contour. The purpose and effect of the "balloon force" are similar to the interior area denominator term of the novel ratio cost discussed later. Amini et al, in an article entitled "Using dynamical programming for minimizing the energy of active contour in the presence of hard constraints," in Proc. Inter. Conf. on Computer Vision (ICCV), pages 95–99 (1988), proposed using dynamic programming as part of an iterative gradient descent procedure. Montanari, in an article entitled "On the optimal detection of curves in noisy pictures," in Communications of the ACM, vol. 15(5), pages 335–345 (1971), uses dynamic programming to detect a globally optimum path through a set of pixels. Later, Geiger at al, in an article entitled "Dynamic programming for detecting, tracking, and matching deformable contours," in IEEE Trans. Pattern Anal. and Machine Intell., vol. 17(3), pages 294–302 (1993), extended this work to accomodate greater uncertainty due to the motion of snakes. Their method finds an optimal solution in polynomial time. Nevertheless, significant computational time is still required though this could be improved substantially.

More powerful techniques attempt to use both region and boundary information in a cost function. Chakraborty et al, in an article entitled "Deformable boundary finding influenced by region homogeneity," in Proc. IEEE Conf. on Computer Vision and Pattern Recognition (CVPR), pages 624–627 (June 1994), recognized the importance of combining contour and region based methods. They proposed a cost function that is the sum of a boundary cost and an a priori term that is provided by a region based segmentation method. Experimental results support combining region and boundary information. However, a global optimization cannot be guaranteed and a separate region segmentation must precede the combined method. Ronfard, in an article entitled "Region-based strategies for active contour models," in Int. J. Comput. Vision, vol. 13(2), pages 229–251 (1994), recently proposed a "region-based energy model for active contours" that again attempts to introduce region information into a contour-based algorithm. However, once again, optimization is difficult and may be susceptible to local minima. Leclerc, in an article entitled "Constructing simple stable descriptions for image partitioning," in Int. J. of Computer Vision, vol. 3, pages 73–102 (1989), proposed a partition process based on a minimum description length representation of both the intensity variation within a region and the enclosing boundary. Most recently, Zhu et al, in an article entitled "Region competition: Unifying snakes, region growing, energy/bayes/mdl for multi-band image segmentation," in Proc. Fifth Int. Conf. on Computer Vision, pages 416–423 (1995), attempted to unify snakes, region growing and energy/Bayes/MDL techniques. However, while these latter approaches offer powerful theoretical frameworks, it is often computationally difficult to minimize the associated cost functions.

Wu and Leahy, in an article entitled "An optimal graph theoretical approach to data clustering: theory and its application to image segmentation," in IEEE Trans. Pattern Anal. and Machine Intell., vol. 15(11), pages 1101–1113 (November 1993), describe an optimal graph theoretic approach to data clustering and their paper provides a good review of many graph based techniques. Wu and Leahy develop a cost function based on boundary cost alone.

SUMMARY OF THE INVENTION

The present invention overcomes the limitations of the prior art by incorporating both interior region and boundary information into the segmentation process using very efficient graph partitioning algorithms. The invention teaches the concept of "ratio regions" which minimize a new cost function based on the ratio of the cost of the perimeter of the segmented region to the benefit assigned to the region's enclosed interior. This cost function allows both boundary and interior information to be used in the partitioning process, though in a more restrictive manner than Leclerc, sipra, or Zhu et al, supra. For example, the boundary cost may be chosen to be a function of the local intensity gradient and the interior benefit to be a function of the area enclosed, in which case, the algorithm has an a priori preference for large, high contrast regions. A significant restriction is that the face weights that compose the interior benefit may not vary as a function of the segmentation, though in practice, interesting partitions are still found.

Distinguishing characteristics of the method include, (1) both interior and boundary information are incorporated into the objective function, (2) the smoothness of the contour arises in a novel way based on the global interaction between the region's boundary cost and interior benefit, and (3) a fully automatic segmentation algorithm can be developed based on this cost function that finds the globally optimum solution with a computational complexity of $O(n^2 \log(CW))$, where C and W are the boundary cost and interior benefit respectively, and n is the number of pixels in the image. The costs C and W enter the complexity of the algorithm because it is necessary to perform a binary search over theses costs, the complexity of which is logarithmic in the range of their values. If CW is polynomially bounded in n, then $\log(CW)$ becomes $\log(n)$. In practice, this may be greatly reduced by seeding the algorithm only with points of high intensity gradient, n', reducing the cost to $O(n'n\log(CW))$. Experimental results for fully automatic segmentation is described below. (4) For the more constrained problem domain in which user interaction is available, the computational cost can be significantly reduced. For example, if the user specifies a single point on the boundary then the complexity reduces to $O(n\log(CW))$. The present invention is primarily concerned with interactive segmentation. In the context of image partitioning and "ratio regions", several levels of user initialization/interaction can be supported that significantly improve the final segmentation by focusing attention on perceptually significant regions, and reduce the associated computational cost. Important considerations for interactive vision algorithms are robustness and speed and ease of use. Experimental results qualitatively demonstrate several modes of interaction ranging from specification of a single point on the contour, to specification of a rectangular or polygonal subwindow that encloses the region of interest, to a complete initialization of the boundary.

The present invention is concerned with ratio regions that minimize the ratio between the cost of the bounding contour and the benefit assigned to the enclosed region. The cost function can be efficiently minimized using graph theory, particularly if user interaction is available. The optimization of the ratio results in a process where smoothness is not enforced locally, but is an induced characteristic that is a consequence of the global optimization, e.g. an a priori preference for local high content regions from setting the numerator to be a function of the intensity derivative while the denominator measures the enclosed area. This is a novel method of imposing image faces and regularization constraints.

In principle, interior information provides useful information pertaining, for example, to the size of the region or its intensity or texture. However, it should be noted that such information is static and not a dynamic function of the segmentation process.

The relative cost associated with the boundary and interior elements provide a dynamic by which to alter the segmentation. Linear scaling of vertex or face costs does not affect the global minimum because it is equivalent to multiplying all objective functions by a constant. Therefore, non-linear scaling must be employed in order to effect a change.

A principle object of the present invention is therefore, the provision of a method of performing image segmentation taking into account both the interior region and boundary information.

Another object of the invention is the provision of a method of finding ratio regions which minimize a cost function based on the cost of the perimeter of the segmented region to a benefit assigned to the region's enclosed interior.

A further object of the invention os the provision of a method of finding ratio regions which minimize a cost function based on the cost of the perimeter of the segmented region to the area of the enclosed region.

A still further object of the invention is the provision of algorithms for finding ratio regions.

Further and still other objects of the present invention will become more clearly apparent when the following description is read in conjunction with the accompanying drawing.

DETAILED DESCRIPTION OF THE INVENTION

The primary algorithmic tool useful for practicing the invention is the pinned ratio algorithm. The algorithm operates on planar graphs where a closed contour in the image will correspond to a cycle in the planar graph. This tranformation is described below.

Formally, the pinned ratio problem is defined as follows. Given a planar graph G = (V, E), where V is a set of nodes, E is a set of edges and each edge e is provided with a nonnegative cost c(e) and each face f of the planar graph is provided with a nonnegative weight w(f), and given a single node v in G and a single face F adjacent to v which is viewed as the exterior face and find a directed path P in G that starts and finishes at v and minimizes $$\mathcal{L} = \frac{\text{cost}(P)}{\text{weight}(P)} \tag{1}$$

where cost(P) is defined as the length of the path under c, and weight(P) is the total weight of the faces that are separated from F by P. The algorithm is contained in Appendix A. A closely related algorithm is described in an article by S. Rao entitled "Faster algorithms for finding small separators in planar graphs," in Proc. of the 24th Annual ACM Symposium on Theory of Computing, pages 229–240 (May 1992).

Figure 1:
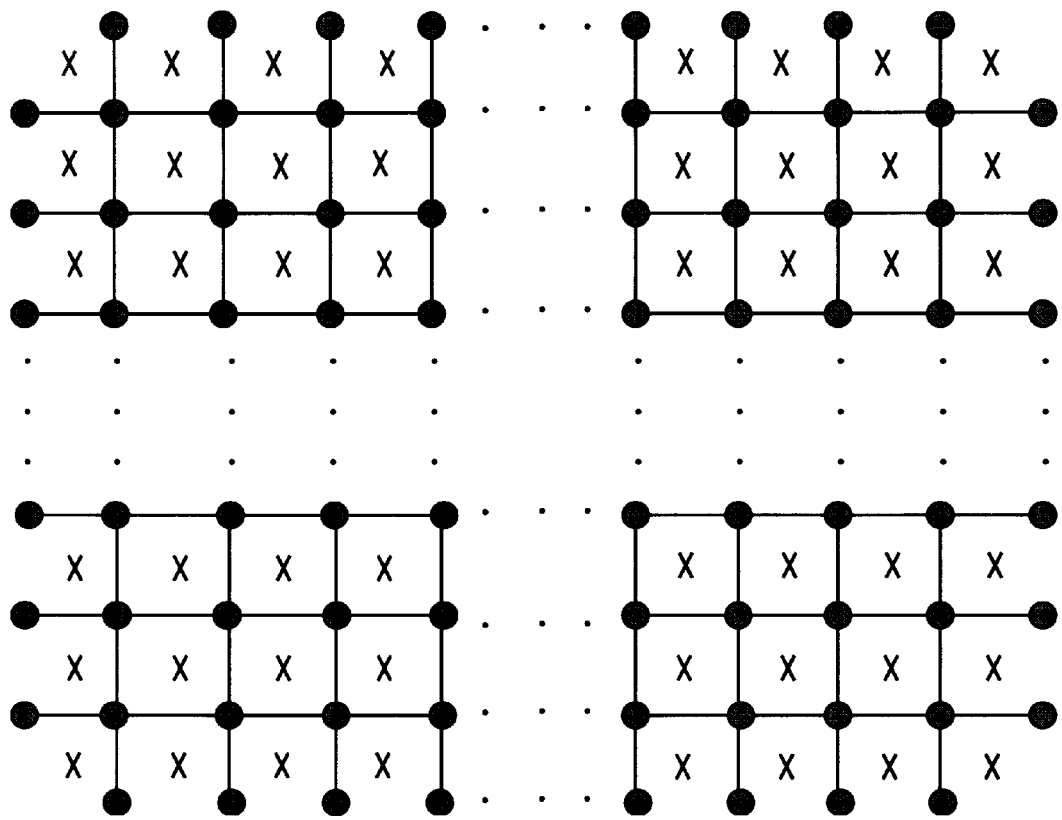
FIG. 1 is a planar graph constructed from an input image.

In order to apply the graph algorithms, there is first constructed a planar graph for each input image. FIG. 1 illustrates a graph constructed from an input image. A four-connected neighbor system for the image is used. A graph arc is established for each neighboring pixel pair of the image as shown in the figure. The four graph arcs that surround an internal pixel enclose a single face of the graph. For an image of size p × q, the corresponding graph has O(pq) arcs and nodes.

The optimal contour is determined by the assignment of edge costs and face weights of the graph. It is crucial to assign proper edge costs and face weights so that the graph cut algorithms will minimize an objective which agrees with the desired segmentation.

First, ignore the intensity information within the region and assign a constant to all the face weights. Then the denominator of Equation 1 represents the area enclosed by the contour. Thus, large regions are preferred to small regions. Assign to each edge a cost that is inversely proportional to the contrast between the two connected pixels. That is, the cost of cutting an edge is low if the intensity difference between the two pixels (faces) is high.

The bias towards large regions must be balanced by the cost of the enclosing contour. This conflict between area and contour determines the resulting segmentation. For example, if the edge costs are too low, then a large region enclosed by weak intensity edges may be preferred over a smaller region of high contrast. Quantitatively, if the edge cost of contour A is $\epsilon$ and that of contour B is n$\epsilon$ the two contours can still have the same objective function values if the area in contour B is n times that of contour A.

Figure 2:
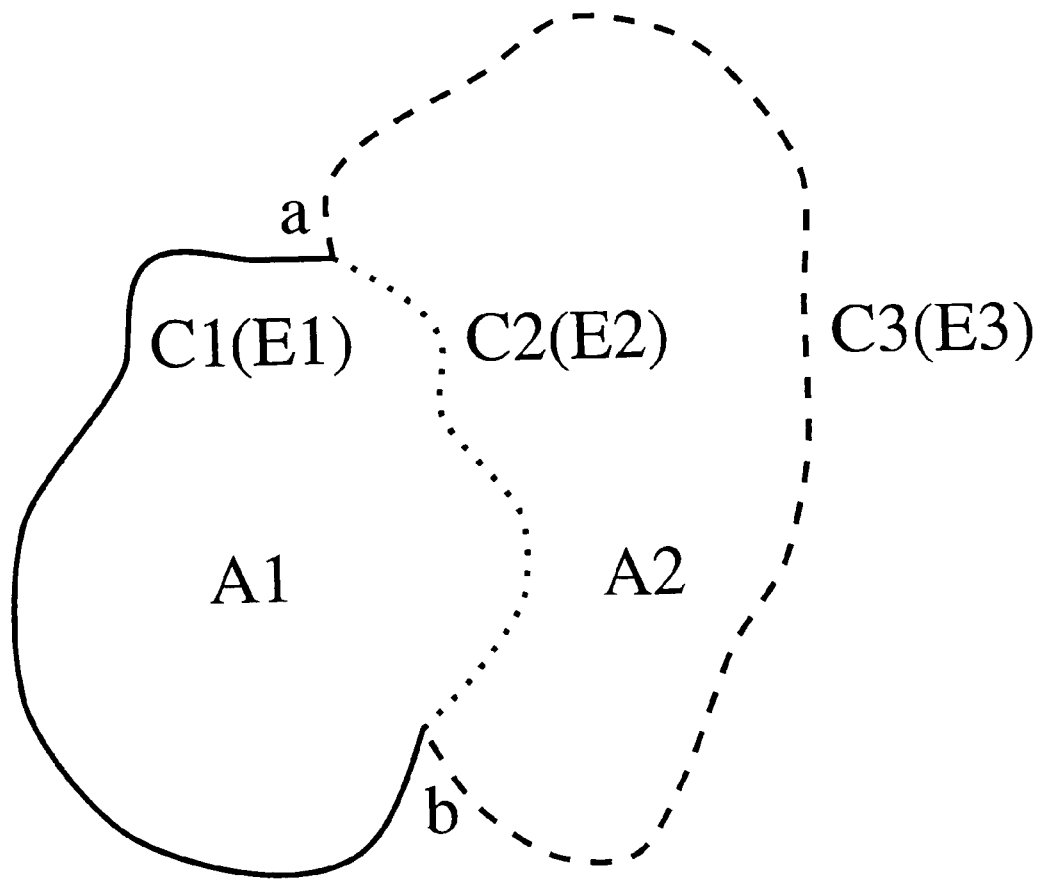
FIG. 2 is a graphical example of contours and enclosed regions.

To better understand the situation, consider the example shown in FIG. 2, where three open contours C1, C2, and C3 are shown, where C1 and C2 enclose region A1, and contours C2 and C3 enclose region A2. If the total edge costs on C1, C2, and C3 are E1, E2, and E3 respectively, there are conditions when the closed contour C1 + C3 will be preferred to C1 +C2. The objective for C1+C2 is given by $$\mathcal{L}1 = \frac{E1 + E2}{A1};$$

the objective for C1+C3 is given by $$\mathcal{L}2 = \frac{E1 + E3}{A1 + A2}.$$

It is then easy to derive that $\zeta 1 >= \zeta 2$ if and only if $$E3 < E2 + (E1 + E2)\frac{A2}{A1}. \quad (2)$$

Figure 3A:
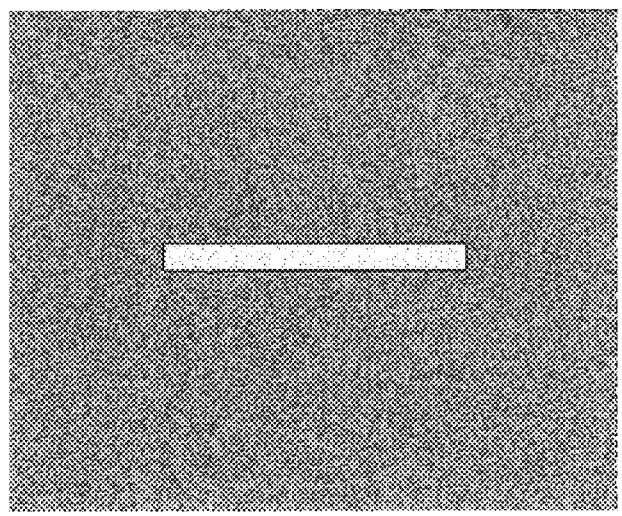
FIGS. 3a, 3b and 3c are images showing the affect on the pinned ratio algorithm of objects with varying areas.
Figure 3B:
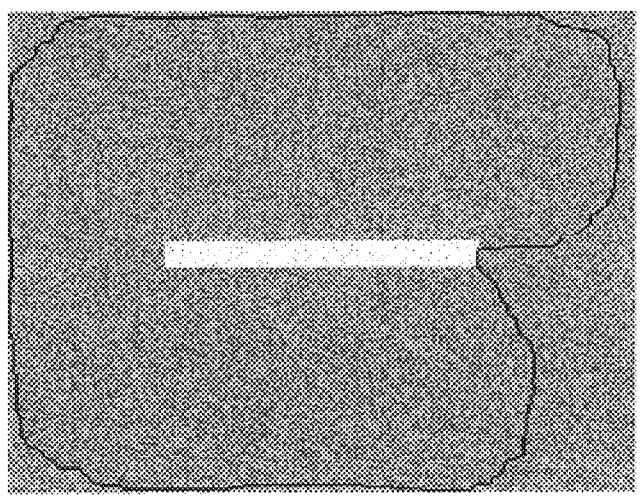
Figure 3C:
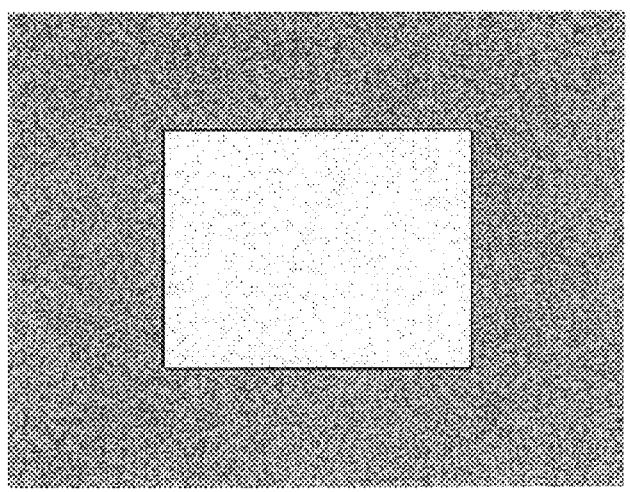

Clearly, contour C3 will always be preferred over C2 if its cost is less, i.e. E3 < E2, since more area is enclosed by C1+ C3. However, in the limit, for abitrary C1, C2, E1, E2, and A1, there always exists a contour C3 such that A2 can be so large that the inequality in Equation 2 will hold, regardless of the edge costs on C3. This is because while the contour cost increases linearly with the length of the contour, the area increases quadratically. Fortunately, this does not occur in practice, since images are of finite size. Nevertheless, the algorithm may not find a small high contrast object in a large image if the edge and face weights are incorrectly chosen. That is, the cost function is not scale invariant, but biased towards large regions. FIGS. 3a–3c illustrate this point. FIG. 3a shows a large white rectangle on a dark background with white Gaussian noise added to the image. The black boundary shows that the white rectangle is easily segmented from the image. FIG. 3b is similar to FIG. 3a, but the white rectangle is now much narrower with correspondingly less area. In this circumstance, the algorithm fails to find the rectangle, but instead, finds a region with higher boundary cost but significantly larger area and correspondingly smaller ratio cost.

There are two solutions to this problem; increasing the edge costs or reducing the face costs. However, linear scaling of edge costs or face weights has no effect, since the minimum ratio solution will remain the same. It is therefore necessary to alter the costs in a non-linear fashion in order to affect the segmentation. An example of this is shown in FIG. 3c where the edge costs have been squared. In this case, the correct segmentation has been found for the narrow rectangle. An alternative solution is to confine the graph to a subregion of the image that encloses the object of interest and within which the object of interest is large.

It is very easy to encode region information into the formulation as long as a model (constant intensity, homogeneous region, or texture models) of the enclosed region is available and static. By static, it is meant that the model cannot be a function of the segmentation process. This is a limitation of the invention but nevertheless, different weight functions can be defined to serve different purposes. The general guidance is that, because the algorithm minimizes an objective which is inversely proportional to the summation of the face weights in the region, it is possible to relate the weight function to the residuals of the region model, in a way that the weight is a decreasing function of the residuals. This ensures that the better the region agrees with the model, the smaller the objective function values will be.

In the following description, unless otherwise stated, the face weights were set to unity and the denominator term favored regions of large area. However, many other face weights are possible. There are defined two such face weight functions which are appropriate for segmentations of (i) a region with a known constant intensity value, and (ii) a homogeneous region with an unknown intensity.

For a region with a known constant intensity value, let the greyscale value of the desired region be $I_R$. The intensity model for the region is $I_i = I_R + \epsilon_i$ for the ith pixel, where $\epsilon_i$ is the residual value. The face weight function is defined as:

$$weight(i) = exp\{-\alpha \epsilon_i^2\} = exp\{-\alpha (I_i - I_R)^2\}. \quad (3)$$

where parameter $\alpha$ is related to the variance of the noise process $\epsilon_i$. This weight is used to segment regions of known intensity.

For a homogeneous region with an unknown intensity, assume a simple MRF model for the homogeneous region with an unknown intensity:

$$I_i = \frac{1}{N}\sum_j I_j + \epsilon_i$$

where the summation is over the neighboring N pixels (N = 4 in our case). Then the face weight function is given by:

$$weight\,(i) = exp\{-\alpha \epsilon_i^2\} = exp\left\{-\alpha\left(I_i - \frac{1}{N}\sum_j I_j\right)^2\right\} \quad (4)$$

This weight is used to segment homogeneous regions of an unknown intensity.

This function penalizes faces near the boundary of a region, but other weight functions are possible that avoid this result. However, the primary goal is to describe how a wide variety of region information might be incorporated into the ratio cost function but one must be aware that specific proposals may not be optimal for all cases.

The edge costs are defined so that the contour is attracted to salient edges in the image, i.e. edge costs should be small near pixels of high gradient magnitude. The choice of the edge cost function (for a byte image) is as follows:

$$edge(i) = (255 - |grad(i)|)^p \quad (5)$$

where grad(i) is the difference of the pixel intensity values at each side of edge i, that is, the greyscale gradient at the edge, and the maximum absolute greyscale gradient is 255. This edge cost applies when the edges of the object boundary are very strong and consistent. However, when the contours are of low contrast, the edge cost tends to be dominated by the effect of the face weight. To remedy this, it is necessary to increase the penalty difference between strong edges and weak edges. Note once again that by multiplying all the edge costs by a constant, the optimal solution remains the same because it is equivalent to multiplying all objective functions by the same constant. Appropriate nonlinear transformations can change the edge costs such that a different segmentation is found, e.g. by varying the value of p in Equation 5.

A nonlinear transform was used which also has the effect of normalizing. This edge cost measure is based on the histogram of the absolute gradient |grad(i)| for all the edges. Let X be the random variable of the absolute gradient of all the edges, the new edge cost is defined as:

$$edge(i) = Prob(X > |grad(i)|) \tag{6}$$

The edges in the image, which usually possess high gradient magnitude, correspond to the upper tail in the histogram. So the costs of true edges are no larger than the proportion of the edge pixels in the image, which is a very small number. Note that the cost is monotonically decreasing with gradient magnitude between 0 and 1. Consideration was given to basing the edge cost simply on the frequency of the absolute gradient, i.e. edge(i)=Prob(X), but this is not monotonic and did not fit our intuition that the larger the gradient, the smaller the edge cost should be. The cost function of Equation 6 was found to give better results than that of Equation 5.

The proposed method appears to be quite different from the active contour model in that it prefers large objects in the image, while a snake has the tendency to shrink. The objective function of a snake is a weighted sum of different terms describing the curvature, the coherence, and the image forces, so that the contour is locked to salient edge features while maintaining its smoothness. The algorithm uses both border and region information, minimizing the ratio of the cost of a boundary to the benefit associated with the enclosed region. Despite these differences, the two approaches are related.

The original snake proposed by Kass et al., supra, is an energy-minimizing spline which minimizes the following energy term:

$$\mathcal{E}_{snake} = \int_0^1 \mathcal{E}_{int}(v(s)) + \mathcal{E}_{image}(v(s)) + \mathcal{E}_{con}(v(s)) ds \tag{7}$$

where $\epsilon_{int}(s) = (\alpha(s)|v_s(s)|^2 + \beta(s)|v_{ss}(s)|^2)/2$ characterizes the stretch and smoothness of the snake, $\epsilon_{image}(v(s))$ represents the image forces, and $\epsilon_{con}(v(s))$ represents the external constraint forces.

When it is used for image segmentation, the external constraint forces are ignored and the images forces are taken to be $\epsilon_{edge} = -|\nabla I(x,y)|^2$. The energy function is a mixture of a coherence term which reduces the length, a smoothness term which reduces the curvature and the edge term which increases the image gradient. In particular, the smoothness measure, in terms of sum of squared curvature, is calculated based on the local geometry on the image grid.

The preferred objective function, which can be viewed as the ratio of a weighted length to a weighted area, imposes the smoothness and image forces in a different way. In a simplified case, ignoring the image information and using the unit edge cost and unit face weight assignment in Equation 1, the function reduces to:

$$\mathcal{L} = \frac{\sum_i \text{cost}(e_i)}{\sum_j \text{weight}(f_j)} = \frac{\sum_i 1}{\sum_j 1}, \tag{8}$$

which is the perimeter of the contour over the area enclosed. If we condition on the length of the perimeter, the area is maximized when the contour becomes a circle, which gives the optimal solution. The same result is obtained if the image force is nullified in the formulation of the snake (Equation 7) and the smoothness term of the sum of squared curvature is minimized. This is true because the total curvature is a constant of $2\pi$ (for a closed contour). Under this constraint, the integral of the squared curvature is minimized if the curve has constant curvature everywhere, i.e. is a circle. Furthermore, if the perimeter is allowed to change, the conditioned minimum $\zeta$ in Equation 8, achieved at a circle, is inversely proportional to the radius of the circle $$\left(\frac{\text{perimeter}}{\text{area}} = \frac{2}{\text{radius}}\right).$$

It is interesting to note that the sum of the squared curvature in Equation 7 is also inversely proportional to the radius of the circle. In the snake energy function, the smoothness term itself favors smooth and large contours. But the stretch term prefers contours of short lengths. These two terms serve inconsistent purposes. It depends on the relative weighting between the two regularization terms whether large or small objects are preferred, which is rather ad hoc. In contrast, it is preferable to encode the smoothness constraint from a global point of view via the area and perimeter measures. This has the advantage over the local enforcement because the local curvature calculated from the neighboring pixels on the grid are subject to discretization errors. The effect of image forces takes place when we weight the perimeter and area elements according to the image features. By choosing different edge costs and face weights different segmentations can be achieved. This may be viewed as a new way to impose image forces and regularization constraints.

The contour optimization algorithm has been tested on a variety of images including medical cardiac images and outside scenes. The pinned ratio algorithm, finds the optimal contour which passes through a given node. However, segmentation can be either fully automatic or with increasing degrees of interactivity. Unless otherwise stated, the edge cost is the cumulative probability measure of Equation 6 and the face weights are set to unity.

In the automatic segmentation mode, no a priori knowledge is available about the location of the contour. The program automatically searches the image for the contour which minimizes the objective function. Since the algorithm needs an initializing node (seed) before returning the optimal closed contour it is possible, in principle, to repeatedly run this program for all possible starting nodes. In practice, some simple heuristics can be applied to greatly reduce the computation. For example, as the pixels of large gradient magnitude are likely to be on or near the object boundary, the best solution should pass some such points. Therefore, it is possible to use high gradient magnitude edge points as seeds and approximate the best contour in the image as follows: (a) first, locate all the high gradient points in the image; and (b) run the contour optimization algorithm using each of the salient gradient points as the seed or root node. Then an optimal closed contour for each edge pixel is obtained. Return the contour which has the minimum objective as the best closed contour in the image.

Figure 4A:
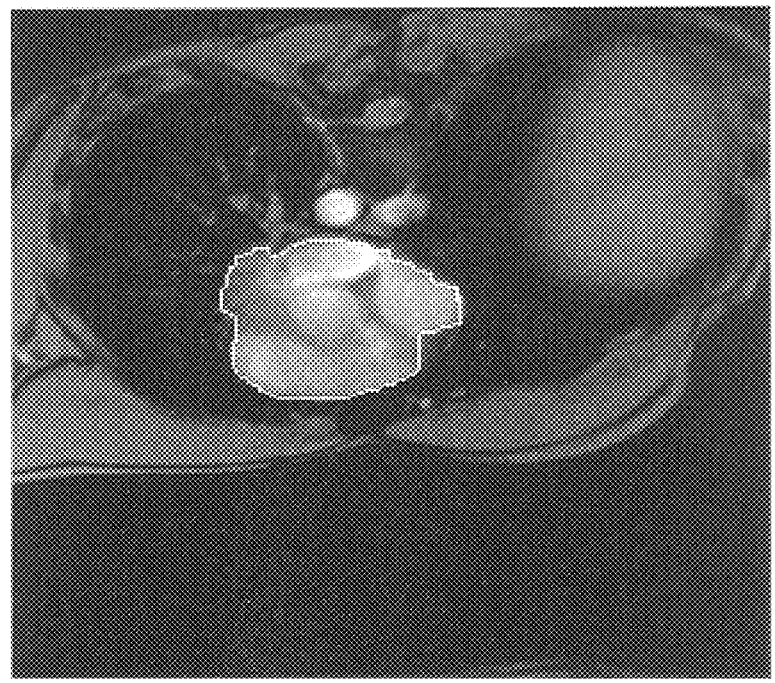
FIGS. 4a and 4b illustrate automatic segmentation of an image.
Figure 4B:
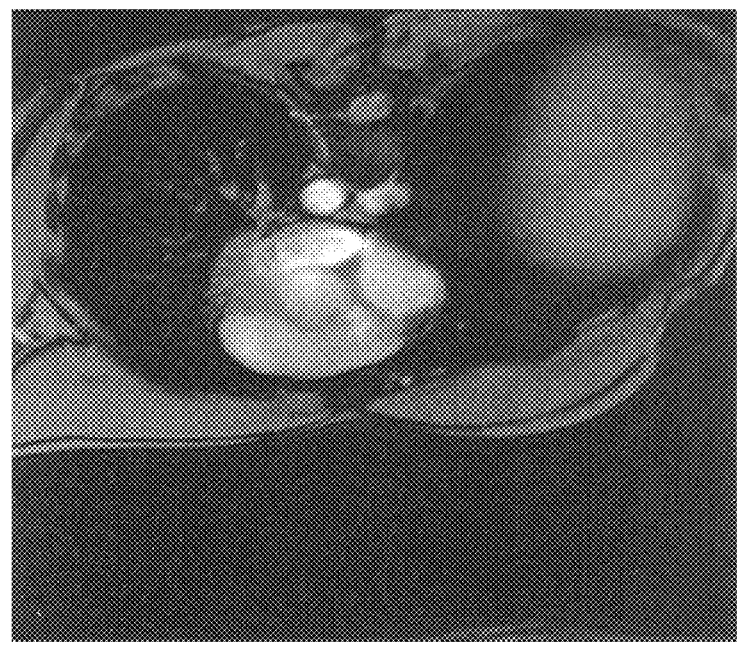

FIGS. 4a and 4b show results of automatic segmentation on a medical image. FIG. 4b illustrates the complex interplay between the boundary and interior costs. While larger regions exist in the image, they are bounded by lower contrast edges with correspondingly higher costs. The vertical segment on the left part of the boundary appears to cutoff a small bright region. However, a careful examination of the original image in FIG. 4a shows that there is a higher contrast vertical edge within this bright region and it is this edge that the segmentation prefers.

In many applications, user interaction is available to constrain the search range, thereby reducing the amount of computation. This interaction can be expressed in terms of (i) specifying a point on the contour, (ii) specifying a region where the contour lies in, and (iii) specifying a band around the contour.

When a point on the contour is known, this point is used as the root node for the core algorithm, which returns the optimal closed contour that passes through this point. Sometimes it may be difficult to provide a node which is exactly on the desired segmentation contour. It is more useful in practice to provide a point and the program computes the best contour near the given point. The algorithm can be extended to support this. To do so, simply define a neighborhood around the selected point, and apply the contour optimization algorithm using each pixel in the neighborhood as the root node, and then return the contour which has the minimum objective. Further computational savings can be achieved by restricting root nodes to be edge pixels, i.e. having high intensity gradient within a given neighborhood rather than any pixel.

In some applications a region of interest can be specified in the input image within which the optimal closed contour is desired. To support this, a planar graph is constructed only for the region of interest, i.e., the region enclosed by a user specified polygon, by removing all the nodes and arcs outside the polygonal region. Also, a user can either specify a particular root and find the best contour in the region which passes through the root, or let the program automatically find the best solution in the region as described above. Note that the complexity of the pinned ratio program is $O(n\log n)$ where n is now the number of pixels in the region of interest.

Figure 5A:
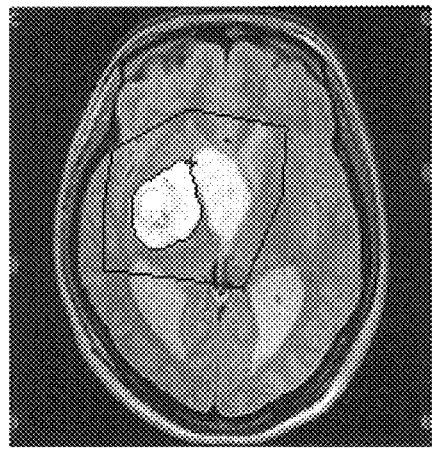
FIGS. 5a, 5b, and 5c illustrate several examples in which a user-specified sub-region is provided.
Figure 5A:
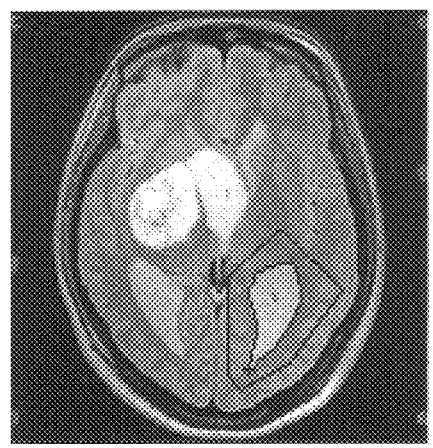
Figure 5B:
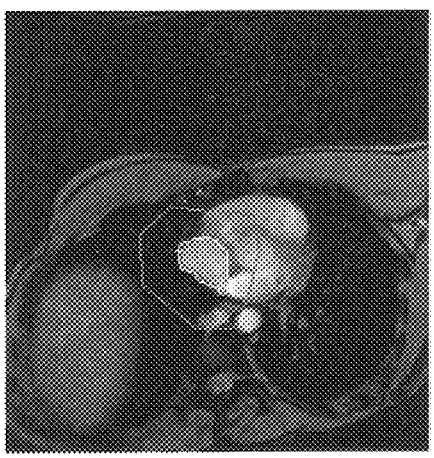
Figure 5B:
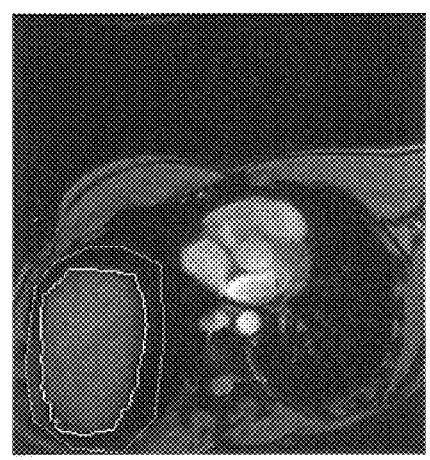
Figure 5C:
Figure 5C:
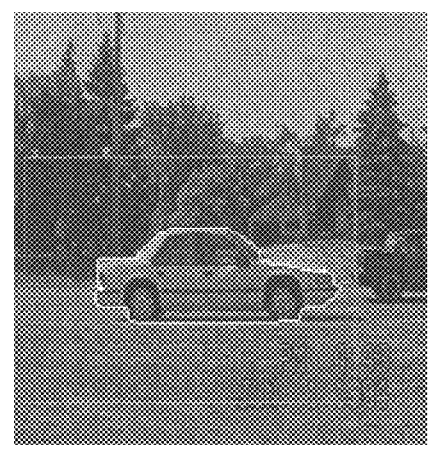

FIGS. 5a–5c illustrate several examples in which a user-specified subregion is provided. Defining a subgraph within which to search, is significantly different from providing a coarse initial contour. In particular, FIG. 5a illustrates that the final optimum contour may be a significant distance from the boundary of the subregion. Similarly, in FIG. 5c, it is unlikely that a traditional snake would find the cars based on the rectangular initialization, especially because the presence of high contrast structure between the boundary and the cars would almost certainly result in a strong local minimum near these structures. However, it is not always obvious what region will be selected. For example, in FIG. 5a two bright regions are included in the polygonal subregion but only the left one is selected.

The active contour model can also be supported within the present framework, provided a closed contour is desired. To do so, an initial closed contour is drawn, and a "band" is derived around it. Then the best contour contained in the graph defined by this band, i.e., in the vicinity of the initial contour. Special care should be taken to construct the planar graph for such a segmentation task, since the segmentation should be within the band only. The graph is set up as follows: (1) first, construct a planar graph for the whole image as described in FIG. 1. (2) Then, remove all the nodes and the corresponding arcs in the region surrounding the "band". (3) To handle the "hole" region, remove all the nodes and the corresponding arcs inside the "hole". In this way, all the small faces inside the "hole" region merge together and this region collapses into a single face. This face is then assigned a weight which is the summation of the weights of all the small faces inside it.

Figure 6A:
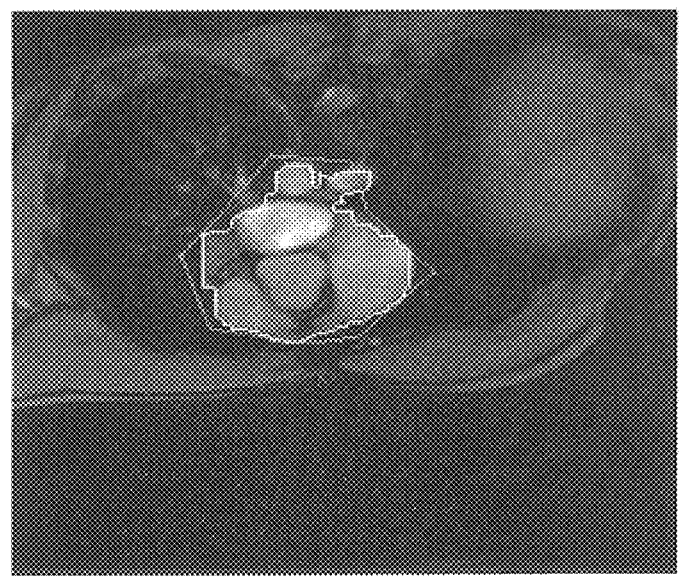
FIGS. 6a and 6b illustrate representative segmentations based on the "snake" approach.
Figure 6B:
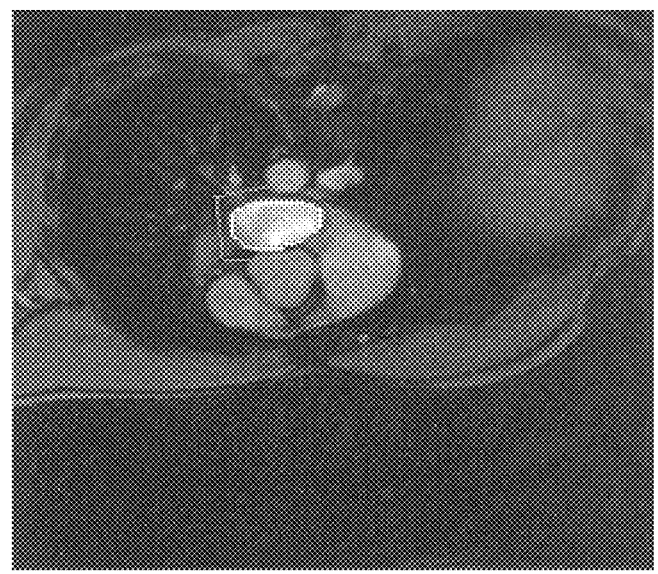

By applying the contour optimization algorithms to this graph the only contours located are those that reside in the specified "band". FIGS. 6a and 6b illustrate representative segmentations based on this "snake" approach. In each of the image, an initial contour, in the form of a dark polygon is drawn. Then a predetermined width (in the FIG. ±15), is used to form a "band" centered at the initial contour. The best contour in the "band" is then located. Note that, for a fixed width, the number of the pixels in the "band" is linear with respect to the length of the contour and the complexity is approximately $O(l\log l)$ where l is the contour length. Two examples of this form of initialization are shown in FIGS. 6a and 6b.

In the above experiments, a face weight of unity was used and the cumulative probability arc cost defined by Equation 6. It will now be shown varying the arc costs and/or face weights can affect the segmentation results. In each case, the segmentation was initialized with a single point on the desired contour. This is denoted by a cross in the corresponding figures.

Figure 7A:
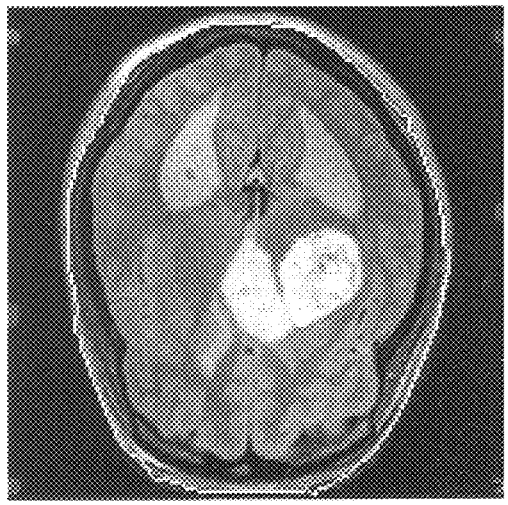
FIGS. 7a, 7b, 7c and 7d illustrate the affect of different arc costs on the segmentation.
Figure 7B:
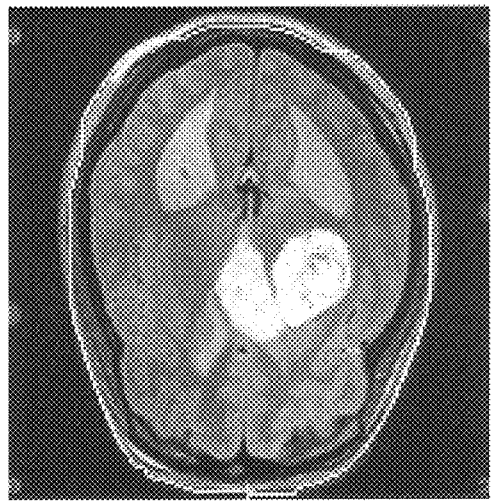
Figure 7C:
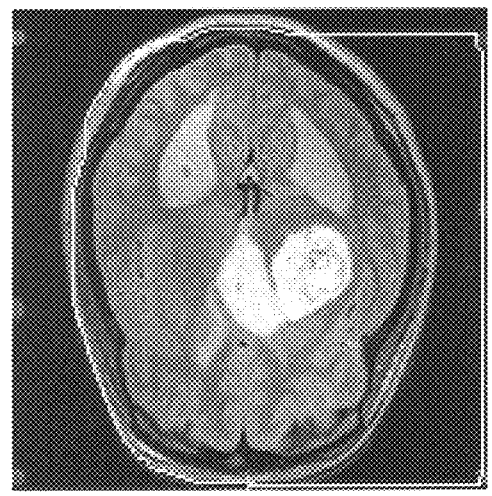
Figure 7D:
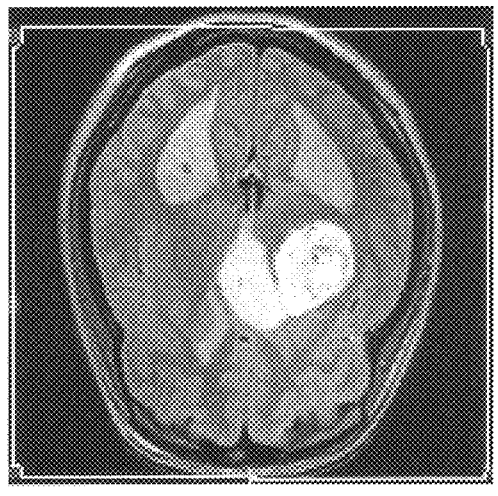

In FIGS. 7a to 7d the power function in Equation 5 was different with different powers p. FIG. 7a shows the segmentation when p = 0.5 is used. This cost is very poor in discriminating the strong edges and poor edges. So the area term plays the major role in the segmentation. As a result, the segmentation encloses almost the entire image with a contour of rather poor intensity gradient. In FIG. 7b a value of p = 0.9 was used, which discriminates more strongly between strong and weak edges. The segmentation identifies half of the object boundary, but also includes a very weak edge. The power p was increased to rescale the cost nonlinearly with respect to gradient magnitude. When p = 0.95, the cost is sufficient to overcome the effect of inflating area (FIG. 7c). The segmentation using the cumulative probability cost is presented in FIG. 7d. Because of the high contrast of the boundary, the segmentation using the polynomial arc cost with power 0.95 is very similar to the one using the cumulative probability cost. However, because there are several very closely aligned edges at the boundary, the optimal contour passes through the inner and outer edges inconsistently, based on the conflicts between the area gain and the edge cost. Note that this image presents a tough problem for most contour based segmentation approaches.

Figure 8:
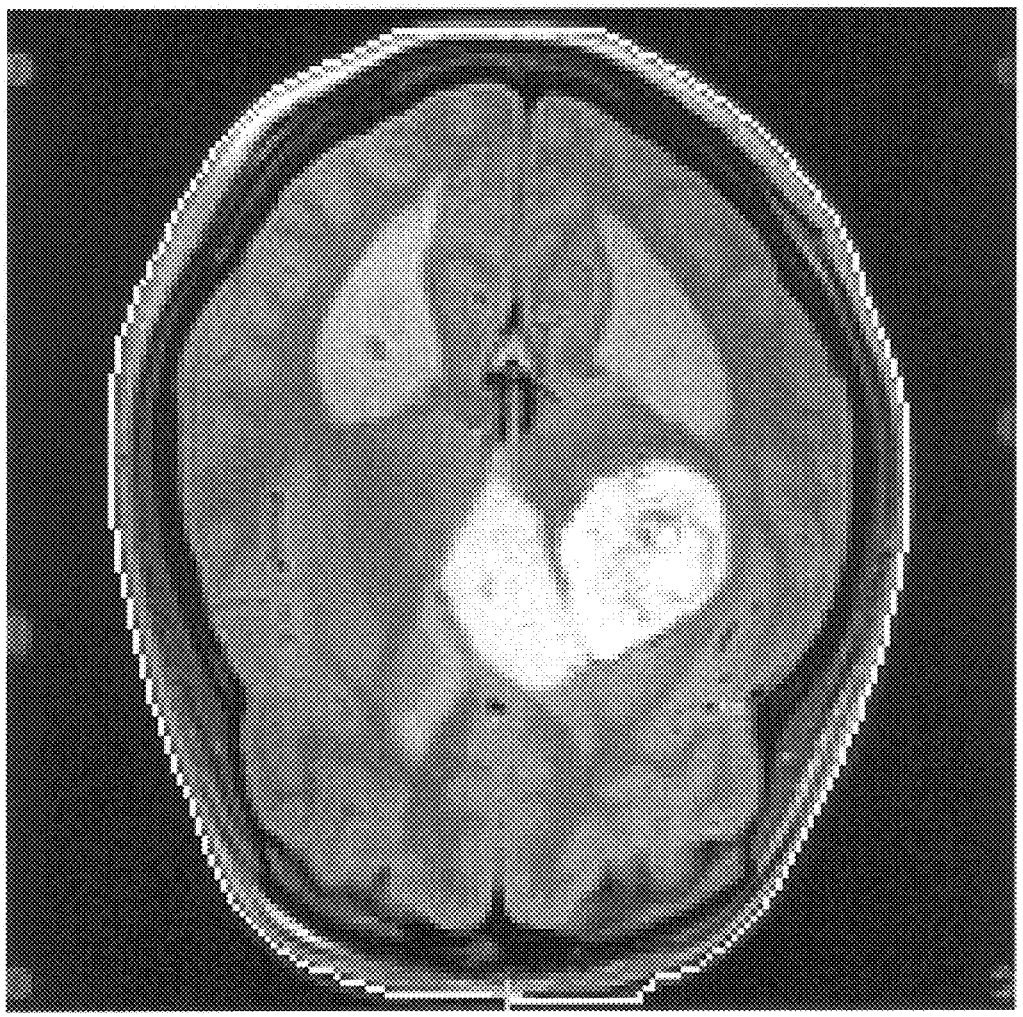
FIG. 8 illustrates segmentation using an arc cost which incorporate images curvature.

A more elaborate arc cost which incorporates the image curvature can produce more consistent and smoother contours. This can be accomplished by assuming that the contour curvature "coincides with appropriate changes in intensity" as in Geiger et al, supra. This quantity can be calculated a priori for every pixel in the image. Then define a new arc cost which is a weighted sum of the previous cost and the average image curvature of the two pixels aside of the arc. This objective function prefers small curvature as well as large image gradient. This curvature is not based on the geometry of the contour. Instead, it requires that arcs on the contour have small image curvature. FIG. 8 shows the best segmentation of a brain image when image curvature is used in the arc cost. This time the outer edge is consistently located. In all the segmentations the unit face weight is used.

Figure 9A:
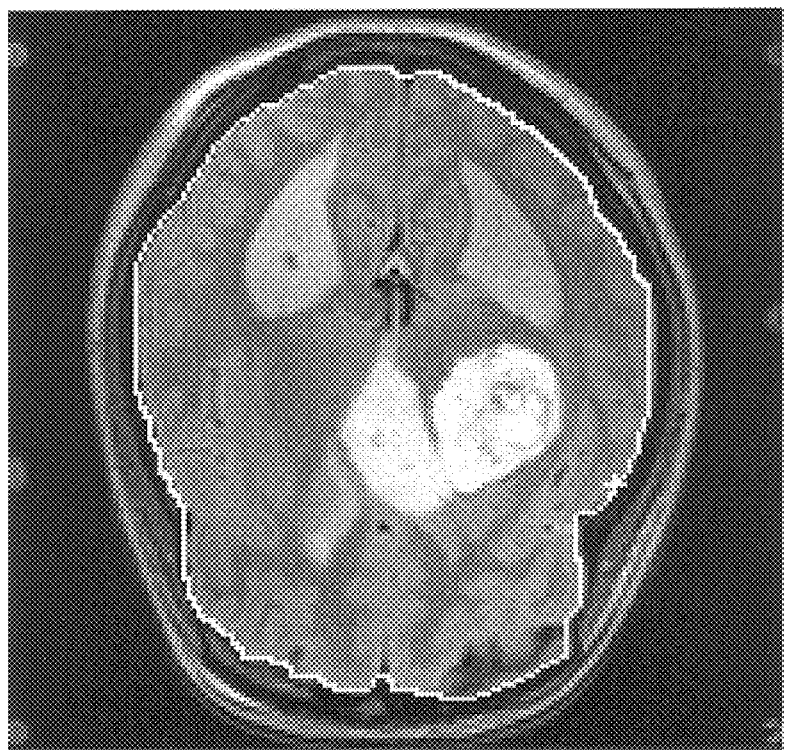
FIGS. 9a and 9b illustrate the adjustment of face weights to obtain different segmentation.
Figure 9B:
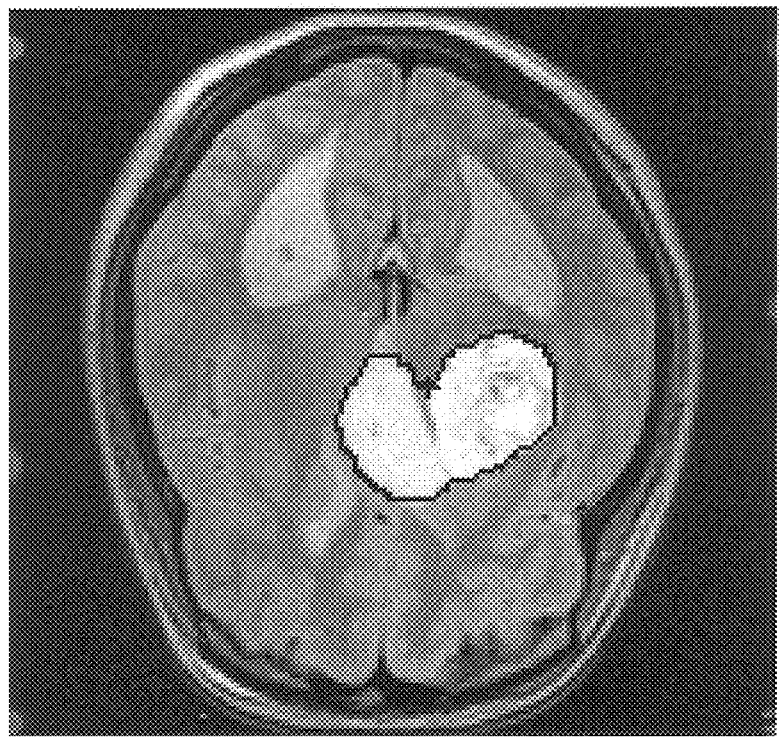

In a final set of experiments, the arc costs were fixed to be the cumulative probability of the gradient magnitude (Eq. 6), and the face weight was manipulated for different segmentation purposes. FIG. 9a shows segmentation of a region of a known intensity. When an intensity of 230 was used the bright region in the brain grey was located. FIG. 9b shows segmentation of a homogeneous region of an unknown intensity, where a face weight was assigned inverse proportionally to the intensity variations at the face pixel. This time it finds the large region of relatively homogeneous intensity, i.e., the boundary of the brain grey in the image. The white contour denotes the segmentation result when the face weight is assigned using Equation 4. The arc cost of cumulative probability of gradient intensity was used.

While there has been described and illustrated a preferred method for image segmentation using ratio regions, it will be apparent to those skilled in the art that variations and modifications are possible without deviating from the broad principles and spirit of the present invention which shall be limited solely by the scope of the claims appended hereto.

APPENDIX A

```
Gen_list *do_cut_algorithm(root, g)
        Node *root;
        Graph *g;
{
    /* Build a shortest path tree in G rooted at root. */
    planar_sp_part(root, g) ;
    dag = slash_construct_dag(root,g) ;
    /* introduces a slash from root to the external face. Then
       constructs a dag based on a tree traversal of the shortest path
       tree where the edges are circularly ordered in a clockwise
       fashion around a node according to a planar embedding of G.
       */
    /* The resulting dag contains a path for each possible pinned
       connected circuit that does not cross the "slash" introduced into
       the image by "slash_construct_dag" at all and crosses any other
       path in the shortest path tree at most once. */
    /* Now binary search using parameterized shortest path procedure
       for alpha where the cost of the shortest path in the dag from the
       first node to the last is 0 where the cost of an arc is
       c' (e) = c(e) - \alpha w(e). */
    bin_solution_cst =
    parameterized_shortest_path(solution_cst+epsilon,dag) ;
    if (bin_solution_cst<solution_cst)
        {
        max_alpha =solution_cst;
        min_alpha = bin_solution_cst/2.0;
        }
    else
        {
        min_alpha =solution_cst/2.0;
        max_alpha = solution_cst;
        }
    while ((max_alpha - min_alpha > epsilon))
        {
        best_alpha = (max_alpha+min_alpha)/2.0;
        bin_solution_cst =
        parameterized_shortest_path(best_alpha,dag) ;
        if(bin_solution_cst == LARGE_FLOAT) break;
        if (bin_solution_cst > best_alpha)
           min_alpha = best_alpha;
        else
           max_alpha = bin_solution_cst;
        }
    return(solution);
}
float parameterized_shortest_path(alpha,dag)
        float alpha;
        Dag *dag;
{
    /* finds the shortest path in a dag from node 0 to node n
       under cost function c(e) - alpha w(e) */
}
float compute_face_cost (i,j,prev_adj,bgn_adjs,adjs)
        int i,j;
        Dadj *prev_adj;
        int * bgn_adjs;
        Dadj *adjs;
/* Computes the sum of costs along a path on some face. */
{
}
Dag *slash_construct_(root, g)
        Node *root;
        Graph *g;
    /* Introduces a slash from root to the external face. Then
       constructs a dag based on a tree traversal of the shortest path
       tree where the edges are circularly ordered in a clockwise
       fashion around a node according to a planar embedding of G.
```

APPENDIX A-continued

```
       */
    /* The resulting dag contains a path for each possible pinned
       connected circuit that does not cross the "slash" introduced into
       the image by "slash_construct_dag" at all and crosses any other
       path in the shortest path tree at most once. */
{
}
```

What is claimed is:

1. A method of image segmentation comprising the steps of:

constructing a planar graph for an image;

specifying a band around an exterior boundary of an image segment;

assigning a cost to said exterior boundary;

assigning a cost to an enclosed region formed by said boundary; and minimizing the ratio of the cost assigned to the exterior boundary to the cost assigned to the enclosed region formed by said boundary using a pinned ratio algorithm;

where the ratio is expressed as $$\frac{\sum_i \text{cost}(e_i)}{\sum_j \text{weight}(f_j)} = \frac{\sum_i 1}{\sum_j 1}$$

and where cost $(e_i)$ is a non-negative edge cost of an edge i which cost is inversely proportional to the contrast between two connected pixels and weight $(f_j)$ is a non-negative face weight function representing an area enclosed by a contour j.

2. A method of image segmentation comprising the steps of:

constructing a planar graph for an image;

assigning a cost to an exterior boundary of an image segment, where said cost assigned to an exterior boundary of the image segment is an edge cost function of the local intensity edge strength;

assigning a cost to an enclosed region formed by said boundary; and minimizing the ratio of the cost assigned to the exterior boundary to the cost assigned to the enclosed region formed by said boundary using a pinned ratio algorithm;

where the ratio is expressed as $$\frac{\sum_i \text{cost}(e_i)}{\sum_j \text{weight}(f_j)} = \frac{\sum_i 1}{\sum_j 1}$$

and where cost $(e_i)$ is a non-negative edge cost of an edge i which cost is inversely proportional to the contrast between two connected pixels and weight $(f_j)$ is a non-negative face weight function representing an area enclosed by a contour j.

3. A method of image segmentation as set forth in claim 2, where said edge cost function is *edge (i)=(255−|grad (i) |)$^p$* where $p$ is a positive value and grad (i) is the difference of the pixel intensity values at each side of edge i.

4. A method of image segmentation as set forth in claim 2, where said edge cost function is *edge (i)=Prob (X>|grad*

$(i)|$) where X is a random variable of the absolute gradient of all edges and $|\text{grad}(i)|$ is the absolute gradient for an edge i.

5. A method of image segmentation comprising the steps of:
   constructing a planar graph for an image;
   assigning a cost to an exterior boundary of an image segment;
   assigning a cost to an enclosed region formed by said boundary; and
   minimizing the ratio of the cost assigned to the exterior boundary to the cost assigned to the enclosed region formed by said boundary using a pinned ratio algorithm, where the ratio is expressed as $$\frac{\sum_i \text{cost}(e_i)}{\sum_j \text{weight}(f_j)} = \frac{\sum_i 1}{\sum_j 1}$$

and where cost ($e_i$) is
   a non-negative edge cost of an edge i which cost is inversely proportional to the contrast between two connected pixels and weight ($f_j$) is a non-negative face weight function representing an area enclosed by a contour j.

6. A method of image segmentation as set forth in claim 5, where the boundary cost is the cumulative probability of the gradient magnitude and the face weight is inversely proportional to the intensity variation at the face pixel.

7. A method of image segmentation as set forth in claim 5, where the face weight is set equal to unity.

8. A method of image segmentation as set forth in claim 5, where the face weight function is exponential.

9. A method of image segmentation as set forth in claim 8, further comprising specifying a point on or exterior boundary as the root node.

10. A method of image segmentation as set forth in claim 8, further comprising specifying a region of the image where the boundary is to be located.

11. A method of image segmentation as set forth in claim 8, where the lowest cost of an exterior boundary is computed by locating all high gradient points in the image and computing the cost of an exterior boundary using each high gradient point as an initializing node.

12. A method of image segmentation as set forth in claim 8, further comprising removing all nodes and boundaries outside a user specified region of the image.

13. A method of image segmentation as set forth in claim 8, further comprising drawing an initial boundary and defining a band around the boundary and computing an optimal boundary in the band.

14. A method of image segmentation as set forth in claim 8, where the cost of an exterior boundary is a weighted sum of a previous cost and the average image curvature of two pixels next to the boundary.

15. A method of image segmentation comprising the steps of:
   constructing a planar graph for an image;
   identifying an initializing node for computing a cost of an exterior boundary of an image segment;
   assigning a cost to the exterior boundary of an image segment;
   assigning a cost to an enclosed region formed by said boundary; and
   minimizing the ratio of the cost assigned to the exterior boundary to the cost assigned to an enclosed region formed by said boundary using a pinned ratio algorithm;
   where the ratio is expressed as $$\frac{\sum_i \text{cost}(e_i)}{\sum_j \text{weight}(f_j)} = \frac{\sum_i 1}{\sum_j 1}$$

and where cost ($e_i$) is a non-negative edge cost of an edge i which cost is inversely proportional to the contrast between two connected pixels and weight ($f_j$) is a non-negative face weight function representing an area enclosed by a contour j.

16. A method of image segmentation as set forth in claim 15, where said initializing node is a high gradient magnitude edge point.

17. A method of image segmentation as set forth in claim 15, where a neighborhood of points around a selected point are initializing points.

18. A method of image segmentation as set forth in claim 15, further comprising as initializing node which is an edge pixel.

19. A method of image segmentation as set forth in claim 15, further comprising said minimizing including user selection of a initializing node.

* * * * *